United States Patent
Bohn

(10) Patent No.: US 6,910,712 B2
(45) Date of Patent: Jun. 28, 2005

(54) METHOD OF FOLDING A GAS BAG FOR A VEHICLE OCCUPANT RESTRAINT SYSTEM AND FOLDED GAS BAG

(75) Inventor: Stefan Bohn, Goldbach (DE)

(73) Assignee: TRW Automotive Safety Systems GmbH & Co. KG, Aschaffenburg (DE)

( * ) Notice: Subject to any disclaimer, the term of this patent is extended or adjusted under 35 U.S.C. 154(b) by 119 days.

(21) Appl. No.: 10/243,504

(22) Filed: Sep. 13, 2002

(65) Prior Publication Data

US 2003/0052480 A1 Mar. 20, 2003

(30) Foreign Application Priority Data

Sep. 14, 2001 (DE) .......................................... 101 45 381

(51) Int. Cl.[7] .............................................. B60R 21/16
(52) U.S. Cl. .................................................. 280/743.1
(58) Field of Search ......................... 280/743.1, 728.1; 493/409, 410

(56) References Cited

U.S. PATENT DOCUMENTS

| | | | | |
|---|---|---|---|---|
| 5,803,892 | A | * | 9/1998 | Marotzke .................... 493/451 |
| 6,115,998 | A | | 9/2000 | Reh et al. |
| 6,171,228 | B1 | * | 1/2001 | Marotzke et al. ............ 493/405 |
| 6,224,100 | B1 | * | 5/2001 | Kamano et al. ......... 280/743.1 |
| 6,248,052 | B1 | * | 6/2001 | Kleeberger et al. ......... 493/374 |
| 6,250,676 | B1 | * | 6/2001 | Werstat et al. ............ 280/743.1 |
| 6,305,150 | B1 | * | 10/2001 | Dietsch ........................ 53/529 |
| 6,327,838 | B1 | * | 12/2001 | Maul et al. .................... 53/429 |
| 6,485,403 | B2 | * | 11/2002 | Kamano et al. ............. 493/457 |
| 6,623,034 | B2 | * | 9/2003 | Dietsch et al. ............ 280/743.1 |
| 6,659,930 | B2 | * | 12/2003 | Florsheimer et al. ........ 439/430 |

FOREIGN PATENT DOCUMENTS

| | | |
|---|---|---|
| DE | 19535564 | 3/1997 |
| DE | 19845721 A1 | 4/2000 |
| DE | 19901472 | 7/2000 |
| EP | 1197401 A2 | 4/2002 |
| GB | 2342322 | 4/2000 |

* cited by examiner

*Primary Examiner*—Faye M. Fleming
(74) *Attorney, Agent, or Firm*—Tarolli, Sundheim, Covell & Tummino L.L.P.

(57) ABSTRACT

A method of folding a gas bag for a vehicle occupant restraint system comprises the following steps: unfolding the gas bag between a base and a hold-down, a traction envelope extending around the gas bag and being passed through the hold-down at a first end, a first lead-through of the traction envelope through the hold-down being contoured so as to correspond to that required of the gas bag when folded; pulling out the traction envelope by means of the first end from a space between the base and the hold-down such that the gas bag is pushed together inside the traction envelope. There is further proposed a gas bag folded by such method.

7 Claims, 1 Drawing Sheet

METHOD OF FOLDING A GAS BAG FOR A VEHICLE OCCUPANT RESTRAINT SYSTEM AND FOLDED GAS BAG

TECHNICAL FIELD

The invention relates to a method of folding a gas bag for a vehicle occupant restraint system as well as to a gas bag folded by such method.

BACKGROUND OF THE INVENTION

Numerous methods are known of translating a gas bag for a vehicle occupant restraint system from an unfolded condition into a compact folded condition, in which the gas bag can be accommodated in a housing. In one known method paddles are used which are placed on the gas bag and form folding edges along which the gas bag is folded. Another known method uses pushers with which the gas bag is pushed together. The drawback of all these methods is the expense in being implemented.

The object of the invention is to provide a method of folding a gas bag which can be implemented cost-effectively.

BRIEF SUMMARY OF THE INVENTION

According to the invention, a method of folding a gas bag for a vehicle occupant restraint system comprises the following steps: first, the gas bag is unfolded between a base and a hold-down, a traction envelope extending around the gas bag and being passed through the hold-down at a first end, a first lead-through of the traction envelope through the hold-down being contoured so as to correspond to that required of the gas bag when folded; next, the traction envelope is pulled out by means of the first end from a space between the base and the hold-down such that the gas bag is pushed together inside the traction envelope. In other words, the gas bag is now pushed together into a compact shape between the hold-down and the base without the complication of having to move pushers or paddles. The space between the base and the hold-down preferably corresponds to the height of the housing in which the gas bag is accommodated in its folded condition. The dimensions of the gas bag in its pushed-together condition then precisely corresponds to the dimensions for its accommodation in the housing.

In accordance with one embodiment of the invention it is provided for that the traction envelope has a second end which is passed through a second lead-through in the base, here again the second lead-through having a contour corresponding to the contour which the folded gas bag is required to have, and that the traction envelope is pulled out of the space between the base and the hold-down also by means of the second end. In this embodiment the gas bag is pushed together symmetrically between the base and the hold-down, which reduces the extent of the relative movements between the traction envelope and the wall of the gas bag and results in more uniform folds in the wall of the gas bag.

The invention also provides a gas bag the wall of which is pushed together from outside to inside, it thus extending in a plurality of single folds. This gas bag is distinguished in that the wall of the gas bag has the least number of folds in those portions in which the movement relative to the traction envelope is least and correspondingly more single folds in the other portions. When the traction envelope is pulled out by only its first end from the space between hold-down and base, the wall of the gas bag comprises the least number of single folds in its portion opposite the lead-through, whereas in the region of the lead-through the wall comprises the highest number of single folds since it is here that the wall is pushed together from all sides and yields chaotically downwards into the interior of the gas bag. When the traction envelope is pulled out at both ends from the space between hold-down and base, the wall will have the least number of folds in the circumferential portion of the gas bag since it is here that it has been urged radially inwards with the least relative movement between traction envelope and wall, whereas those portions of the wall of the gas bag which lie directly opposite the two lead-throughs comprise the most single folds.

Advantageous aspects of the invention will be apparent from the sub-claims.

DETAILED DESCRIPTION OF THE PREFERRED EMBODIMENTS

Figure 1:
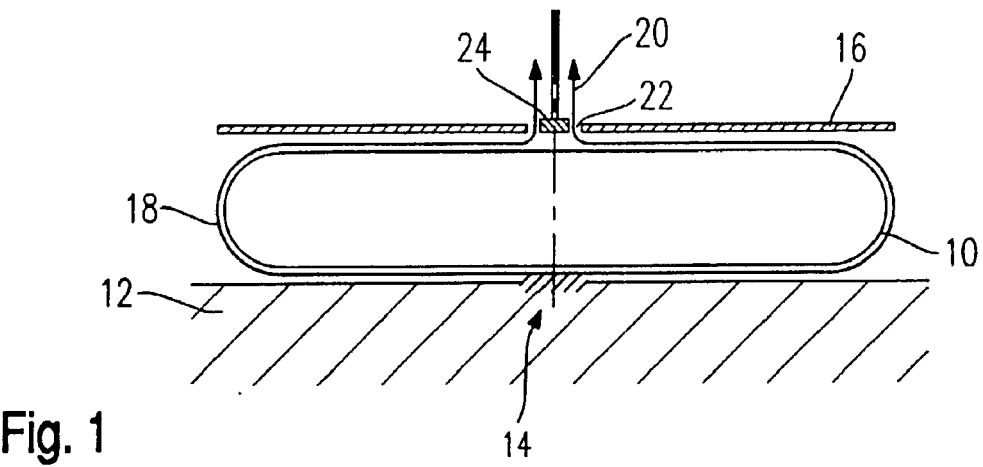
FIG. 1 is a diagrammatic section view of a folding machine by means of which a gas bag can be pushed together in accordance with a first embodiment of the invention.
Figure 2:
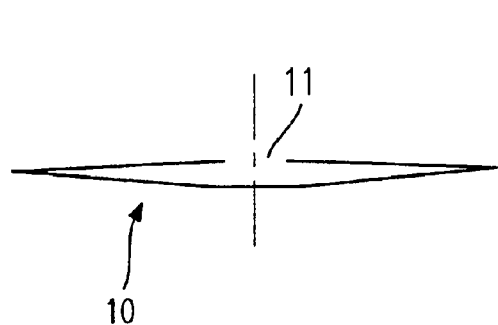
FIG. 2 is a diagrammatic section view through a gas bag.

Referring now to FIG. 1 there is illustrated a first folding machine by means of which a gas bag 10 can be pushed together, it comprising an inflation port 11 (see FIG. 2). The gas bag 10 is spread out on a base 12 of the folding machine where it is secured by a clamping device 14. The clamping device 14 is able, for example, to engage the rim of the inflation port 11 in securely clamping the gas bag to the base. The clamping device 14 is required to securely clamp the gas bag on a surface area corresponding to the later base area of the gas bag pack when fully folded and being ready for installation. Arranged opposite the base 12 parallel thereto is a hold-down 16 the space of which from the base 12 corresponds to the accommodating height of a housing in which the pushed-together gas bag is later to be arranged. Both the base 12 and the hold-down 16 are larger than the gas bag 10, i.e. protrude beyond the outer edge thereof.

Figure 3:
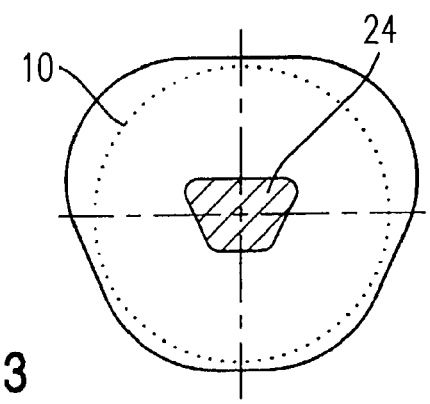
FIG. 3 is diagrammatic plan view of a gas bag arranged in a folding machine.

The gas bag 10 is surrounded by a traction envelope 18 the first end 20 of which is passed through a lead-through 22 in the hold-down 16 and out of the space between the base 12 and the hold-down 16. The contour of the lead-through 22 through the hold-down 16 corresponds to the contour which the folded gas bag is required to have. Arranged in the interior of the lead-through 22 is a plunger 24 adapted to the contour of the lead-through 22. As evident from FIG. 3, the plunger 24 may be, for example, trapezoidal so that the lead-through 22 has a trapezoidal contour, too.

The traction envelope 18 may be configured as a bag having a closed wall, it being possible as an alternative to make use of a plurality of juxtaposed bands secured, for example, in the region of the clamping device 14 at the base 12.

On commencement of folding the gas bag 10 it is unfolded between the base 12 and the hold-down 16. Due to the slight space between the base 12 and the hold-down 16 the gas bag is greatly oblate as compared to its later freely deployed shape.

For deploying the gas bag an inflating device (not shown) may be employed which is in flow connection with the interior of the gas bag through the clamping device 14.

For pushing the gas bag together, the traction envelope 18 is drawn out of the space between the base 12 and the hold-down 16 through the lead-through 22, simply by the traction envelope 18 being pulled by its first end 20. At the same time, the inflating device deflates the gas bag in a controlled way. Once the traction envelope 18 has been pulled out as far as possible from the space between the base 12 and the hold-down 16, the gas bag 10 pushed together in the interior of the traction envelope 18 is contoured corresponding to the contour of the lead-through 22, for example, trapezoidal.

Figure 4:
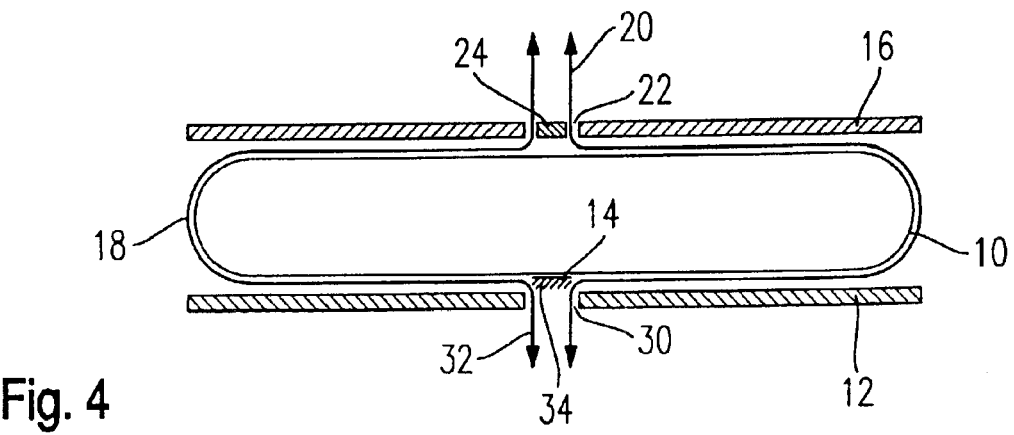
FIG. 4 is a diagrammatic section view of a second folding machine by means of which a gas bag can be pushed together in accordance with a second embodiment of the invention.

Referring now to FIG. 4 there is illustrated a second folding machine. Like components are identified by like reference numerals as in the first embodiment and reference is made to the above explanations.

Unlike the first embodiment, a lead-through 30 is provided in the base 12 in the second folding machine. Passed through the lead-through 30 is a second end 32 of the traction envelope 18. Arranged in the interior of the lead-through 30 is a middle element 34, the function of which corresponds to that of the plunger 24 and which is provided with the clamping device 14.

In the second folding machine both ends of the traction envelope 18 are pulled for folding the gas bag, i.e. the first end 20 upwards and the second end 32 downwards. In so doing, the traction envelope 18 is pulled out of the space between the base 12 and the hold-down 16 symmetrically, and the gas bag is pushed together symmetrically into the contour as provided therefor.

The method as described may also be put to use for a doughnut-shaped gas bag distinguished by an annular chamber and a depression as viewed by the occupant.

What is claimed is:

1. A method of folding a gas bag for a vehicle occupant restraint system, said method comprising the following steps:

unfolding said gas bag between a base and a hold-down, a traction envelope extending around said gas bag and being passed through said hold-down at a first end, a first lead-through of said traction envelope through said hold-down being contoured so as to correspond to that required of said gas bag when folded;

pulling out said traction envelope by means of said first end from a space between said base and said hold-down such that said gas bag is pushed together inside said traction envelope.

2. The method as set forth in claim 1, wherein a plunger is arranged inside said first lead-through passing through said hold-down.

3. The method as set forth in claim 1, wherein provided at said base is a middle element provided with a clamping device for said gas bag.

4. The method as set forth in claim 1, wherein said traction envelope has a second end which is passed through a second lead-through provided in said base, said second lead-through having a contour corresponding to a contour which said folded gas bag is required to have, and wherein said traction envelope is pulled out of said space between said base and said hold-down also by means of said second end.

5. The method as set forth in claim 3, wherein said middle element is arranged inside said second lead-through passing through said base.

6. The method as set forth in claim 1, wherein said traction envelope comprises a closed wall.

7. The method as set forth in claim 1, wherein said traction envelope is formed by several bands arranged juxtaposed.

\* \* \* \* \*